United States Patent
Koh et al.

(10) Patent No.: US 11,775,756 B2
(45) Date of Patent: Oct. 3, 2023

(54) AUTOMATED CAPTION GENERATION FROM A DATASET

(71) Applicant: Adobe Inc., San Jose, CA (US)

(72) Inventors: Eunyee Koh, San Jose, CA (US); Xin Qian, Greenbelt, MD (US); Tak Yeon Lee, Cupertino, CA (US); Sana Malik Lee, Brea, CA (US); Ryan Anthony Rossi, Santa Clara, CA (US); Fan Du, Milpitas, CA (US); Duy-Trung Trong Dinh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 4 days.

(21) Appl. No.: 17/094,435

(22) Filed: Nov. 10, 2020

(65) Prior Publication Data
US 2022/0147708 A1 May 12, 2022

(51) Int. Cl.
| | | |
|---|---|---|
| *G06F 40/216* | (2020.01) | |
| *G06F 40/58* | (2020.01) | |
| *G06F 40/169* | (2020.01) | |
| *G06F 40/56* | (2020.01) | |
| *G06F 40/295* | (2020.01) | |

(52) U.S. Cl.
CPC .......... *G06F 40/216* (2020.01); *G06F 40/169* (2020.01); *G06F 40/295* (2020.01); *G06F 40/56* (2020.01); *G06F 40/58* (2020.01)

(58) Field of Classification Search
CPC .... G06F 40/216; G06F 40/151; G06F 40/157; G06F 40/16; G06F 40/126; G06F 17/175; G06F 17/18; G06F 16/9038; G06F 16/2462; G06F 16/2465; G06F 16/2467; G06F 40/169; G06F 40/295; G06F 40/56; G06F 40/58
See application file for complete search history.

(56) References Cited

U.S. PATENT DOCUMENTS

| | | | | |
|---|---|---|---|---|
| 11,182,539 | B2* | 11/2021 | Ekmekci | G06F 40/166 |
| 2014/0156639 | A1* | 6/2014 | Shridhar | G06F 16/9038 |
| | | | | 707/722 |
| 2015/0039537 | A1* | 2/2015 | Peev | G06N 5/047 |
| | | | | 706/46 |

(Continued)

OTHER PUBLICATIONS

Rope et al., "A prediction processing unit for multiple stage pattern recognition and recommendations for visual analytics", published on Jun. 25, 2020, Document ID DE 112018004687 T5, pages: (Year: 2020).*

(Continued)

*Primary Examiner* — Chau T Nguyen
(74) *Attorney, Agent, or Firm* — FIG. 1 Patents

(57) ABSTRACT

A dataset captioning system is described that generates captions of text to describe insights identified from a dataset, automatically and without user intervention. To do so, given an input of a dataset the dataset captioning system determines which data insights are likely to support potential visualizations of the dataset, generates text based on these insights, orders the text, processes the ordered text for readability, and then outputs the text as a caption. These techniques also include adjustments made to the complexity of the text, globalization of the text, inclusion of links to outside sources of information, translation of the text, and so on as part of generating the caption.

20 Claims, 10 Drawing Sheets

(56) References Cited

U.S. PATENT DOCUMENTS

| | | | |
|---|---|---|---|
| 2017/0053206 A1* | 2/2017 | Kala | G06F 16/26 |
| 2017/0177559 A1* | 6/2017 | Dang | G06Q 30/0201 |
| 2017/0300561 A1* | 10/2017 | Kannan | G06F 16/3344 |
| 2018/0357276 A1* | 12/2018 | Ding | G06F 16/26 |
| 2019/0095499 A1* | 3/2019 | Payne | G06F 16/24573 |
| 2020/0051293 A1* | 2/2020 | Hou | G06F 3/0482 |
| 2020/0257927 A1* | 8/2020 | Nomi | G06K 9/6212 |
| 2021/0248203 A1* | 8/2021 | Li | G06F 16/9535 |
| 2021/0350068 A1* | 11/2021 | Sanossian | G06F 40/186 |
| 2021/0365471 A1* | 11/2021 | O'Hara | G06F 16/26 |

OTHER PUBLICATIONS

"TIBCO Spotfire: Augment Intelligence for Your Business", TIBCO Spotfire, Datasheet [online], TIBCO [retrieved Oct. 13, 2020]. Retrieved from the Internet <https://www.tibco.com/products/tibco-spotfire>., 5 pages.

Alperin, Mike, "Automated Insights Wordsmith Written Analysis for TIBCO Spotfire", TIBCO Community [online] [retrieved Oct. 13, 2020]. Retrieved from the Internet <https://community.tibco.com/wiki/automated-insights-wordsmith-written-analysis-tibco-spotfire#toc-4>., Jun. 1, 2018, 5 pages.

Chisholm, Andrew et al., "Learning to generate one-sentence biographies from Wikidata", ArXiv Preprint [retrieved Oct. 13, 2020]. Retrieved from the Internet <https://arxiv.org/pdf/1702.06235.pdf>., Feb. 21, 2017.

Cornolti, Marco et al., "A Framework for Benchmarking Entity-Annotation Systems", Proceedings of the 22nd international conference on World Wide Web Association for Computing Machinery, New York, NY [retrieved Oct. 13, 2020]. Retrieved from the Internet <https://storage.googleapis.com/pub-tools-public-publication-data/pdf/40749.pdf>., May 17, 2013, 11 pages.

Gu, Jiatao et al., "Incorporating Copying Mechanism in Sequence-to-Sequence Learning", arXiv.org Preprint [retrieved Dec. 14, 2020]. Retrieved from the Internet <https://arxiv.org/pdf/1603.06393.pdf>., Mar. 21, 2016, 10 pages.

Hulsebos, Madelon et al., "Sherlock: A Deep Learning Approach to Semantic Data Type Detection", Proceedings of the 25th ACM SIGKDD International Conference on Knowledge Discovery & Data Mining [retrieved Dec. 14, 2020]. Retrieved from the Internet <https://sherlock.media.mit.edu/assets/2019-Sherlock-KDD.pdf>., Jul. 2019, 9 pages.

Qian, Xin et al., "A Formative Study on Designing Accurate and Natural Figure Captioning Systems", Extended Abstracts of the 2020 CHI Conference on Human Factors in Computing Systems (CHI EA '20). Association for Computing Machinery, New York, NY, Apr. 2020, 8 pages.

Schlesinger, Ari et al., "Let's Talk About Race: Identity, Chatbots, and AI", In Proceedings of the 2018 CHI Conference on Human Factors in Computing Systems, Association for Computing Machinery, New York, NY, USA, Paper 315, [retrieved Jan. 22, 2021]. Retrieved from the Internet <https://dl.acm.org/doi/pdf/10.1145/3173574.3173889>., Apr. 2018, 14 pages.

Specia, Lucia et al., "SemEval-2012 Task 1: English Lexical Simplification", First Joint Conference on Lexical and Computational Semantics, Association for Computational Linguistics, Montreal, Canada [retrieved Jan. 22, 2021]. Retrieved from the Internet <https://www.aclweb.org/anthology/S12-1046.pdf>., Jun. 2012, 9 pages.

Srinivasan, Arjun et al., "Augmenting Visualizations with Interactive Data Facts to Facilitate Interpretation and Communication", IEEE Transactions on Visualization and Computer Graphics, vol. 25, No. 1 [retrieved Jan. 22, 2021]. Retrieved from the Internet <https://www.cc.gatech.edu/~stasko/papers/infovis18-voder.pdf>., Aug. 20, 2018, 10 pages.

Wiseman, Sam et al., "Challenges in Data-to-Document Generation", arXiv.org [retrieved Jan. 22, 2021]. Retrieved from the Internet <https://arxiv.org/pdf/1707.08052.pdf>., Jul. 25, 2017, 13 pages.

Yan, Cong et al., "Synthesizing Type-Detection Logic for Rich Semantic Data Types using Open-source Code", Proceedings of the 2018 International Conference on Management of Data [retrieved Jan. 22, 2021]. Retrieved from the Internet <https://congyan.org/autotype.pdf>., May 2018, 16 pages.

* cited by examiner

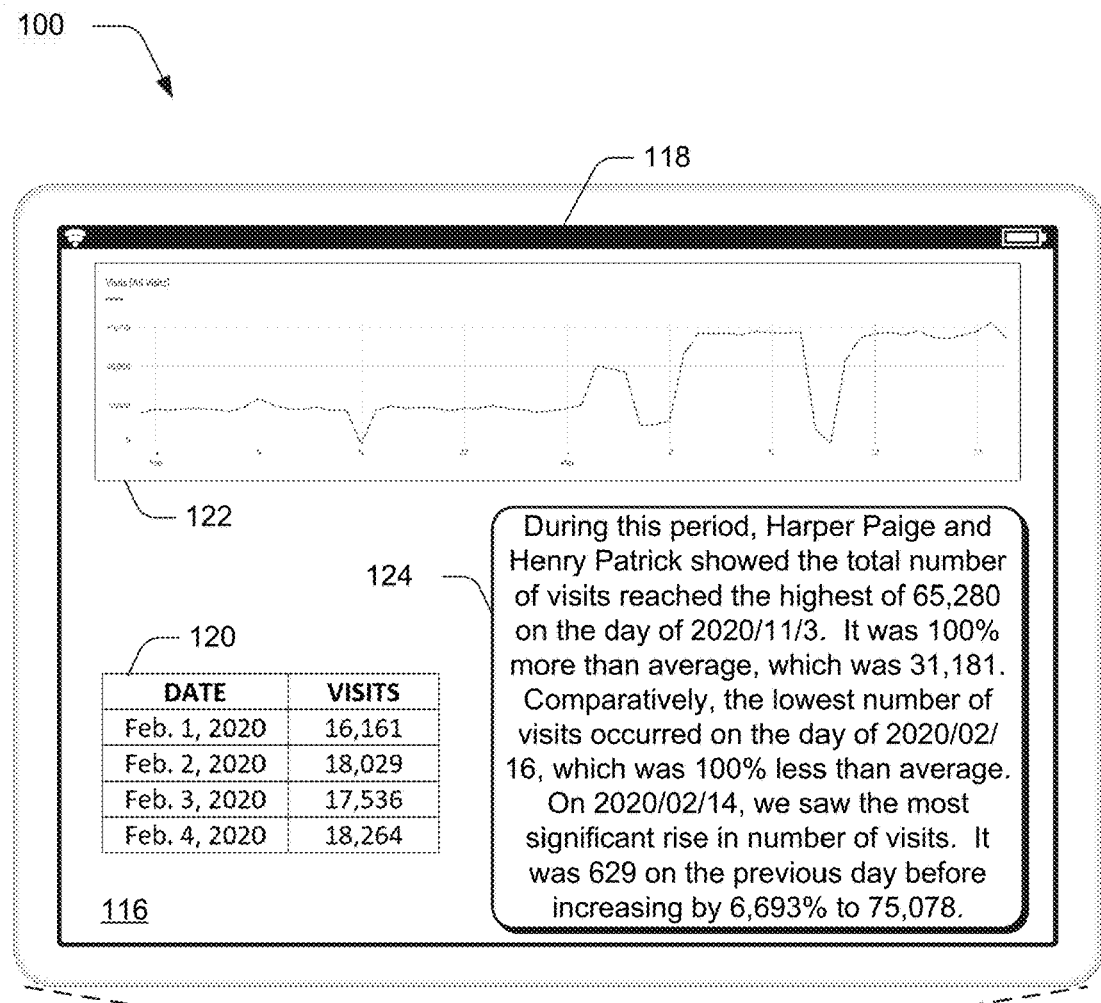
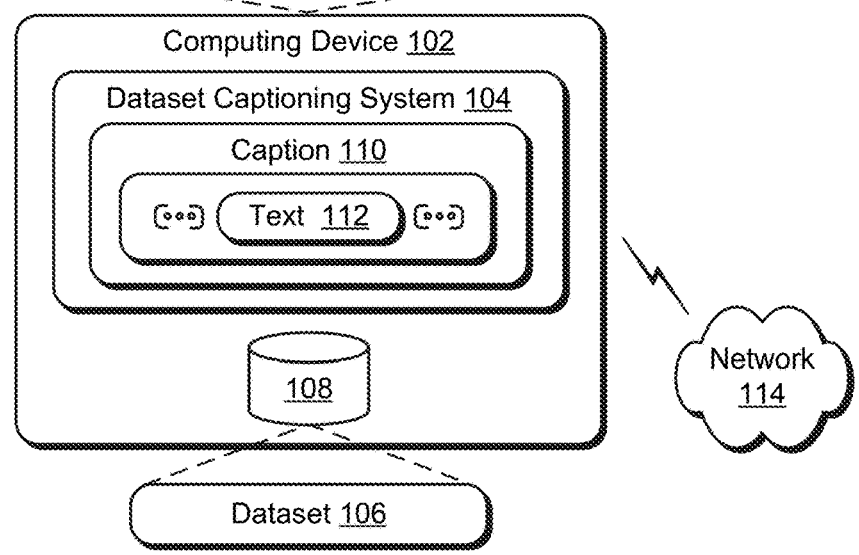
Fig. 1

```
                          300

┌─────────────────────────────────────────────────┐
                    │                      302                         │
                    │  Receive a user input identifying a dataset      │
                    │         having a plurality of data entries       │
                    └─────────────────────────────────────────────────┘
                                          │
                                          ▼
                    ┌─────────────────────────────────────────────────┐
                    │                      304                         │
                    │   Generate, automatically and without user       │
                    │   intervention, a caption that textually         │
                    │              describes the dataset               │
                    │  ┌───────────────────────────────────────────┐  │
                    │  │                    306                     │  │
                    │  │ Generate text based on a plurality of data │  │
                    │  │  insights from the plurality of data       │  │
                    │  │          entries of the dataset            │  │
                    │  │  ┌─────────────────────────────────────┐   │  │
                    │  │  │               308                    │   │  │
                    │  │  │ Determine which datatypes are        │   │  │
                    │  │  │ included in a plurality of data      │   │  │
                    │  │  │       subsets of the dataset          │   │  │
                    │  │  └─────────────────────────────────────┘   │  │
                    │  │                   │                        │  │
                    │  │                   ▼                        │  │
                    │  │  ┌─────────────────────────────────────┐   │  │
                    │  │  │               310                    │   │  │
                    │  │  │ Identify a composition of the        │   │  │
                    │  │  │ dataset based on the data types      │   │  │
                    │  │  └─────────────────────────────────────┘   │  │
                    │  └───────────────────────────────────────────┘  │
                    │                      │                           │
                    │                      ▼                           │
                    │  ┌───────────────────────────────────────────┐  │
                    │  │                    312                     │  │
                    │  │ Generate the text based on data insights   │  │
                    │  │ from the plurality of data entries of the  │  │
                    │  │                 dataset                    │  │
                    │  └───────────────────────────────────────────┘  │
                    │                      │                           │
                    │                      ▼                           │
                    │  ┌───────────────────────────────────────────┐  │
                    │  │                    314                     │  │
                    │  │      Form the caption based on the text    │  │
                    │  └───────────────────────────────────────────┘  │
                    └─────────────────────────────────────────────────┘
```

*Fig. 3*

```
Algorithm 1 Detecting Column Types
0: procedure DETECT TYPE(data_series)
1:   if data_series all match r'[0-9\.]+' then
2:     return QuantitativeType
3:   else if data_series all match r'[0-9](?:st|nd|rd|th)' then
4:     return OrdinalType
5:   else if datetime_API.parse(data_series) == "success" then
6:     return DateType
7:   else
8:     return NominalType
9:   end if
```

*Fig. 6*

```
Algorithm 2 Detecting Cyclic Patterns
1: procedure SIGNIFICANCE TEST(data_series, window_interval, threshold)
2:   if len(data_series) < 2 * window_interval then
       return False    ▷ If the data series is too short, there will be no cyclic
   pattern by default
3:   else
       acf = auto-correlation(data_series, window_interval)
       return acf > threshold    ▷ If the data series is highly correlated with
   its delayed copy, there is a cyclic pattern
```

*Fig. 7*

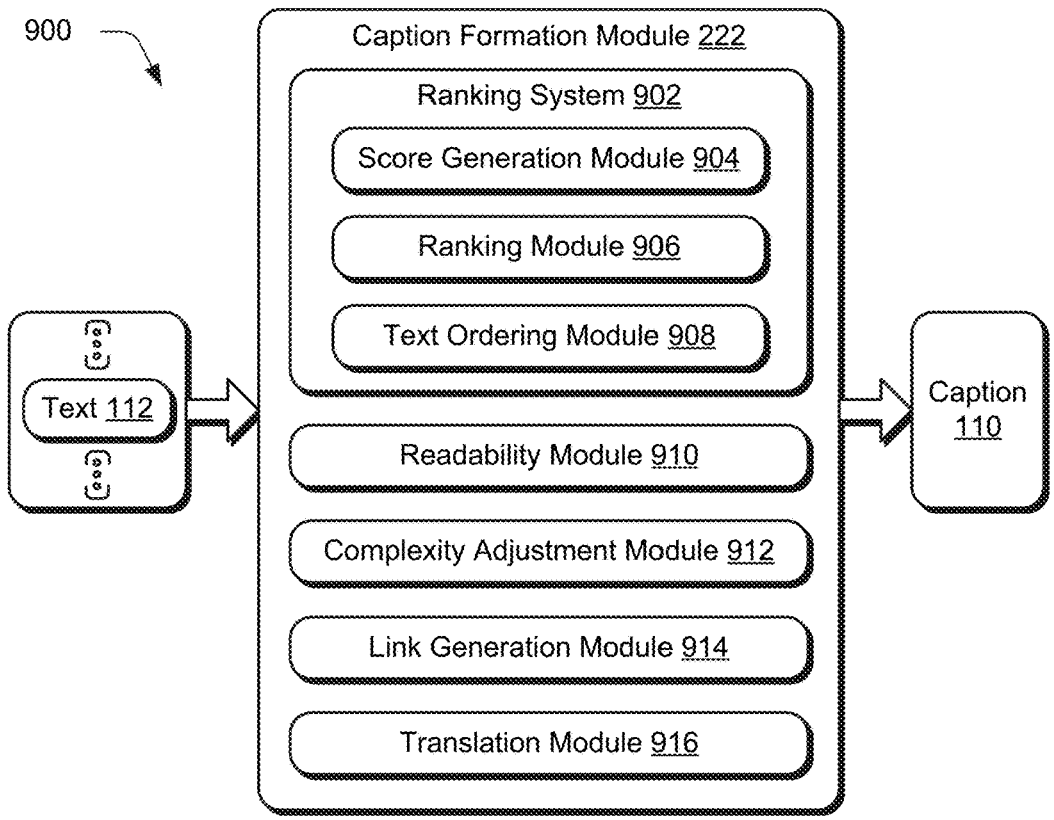

Fig. 9

Algorithm 3: Ranking Insights with Scores

1 if *Insight Type = CyclicPatternFact* then
2     score = 5 ;
3 else if *Insight Type = ExtremeValueFact* then
4     score = 5 if *ExtremeFunction = MAX* else 4.5 ;
5     score += -1 * 0.5 * *Insight Tier* ;
6 else if *Insight Type = RelativeValueFact* then
7     score = 2 - 1.0 / *diffFactor* ;
8 else if *Insight Type = DerivedValueFact* then
9     score = 1 ;
10 else if *Insight Type = DramaticChangeFact* then
11     score = -1 * 0.5 * *Insight Tier* ;
12 else
13     score = 0 ;

Fig. 10

AUTOMATED CAPTION GENERATION FROM A DATASET

BACKGROUND

The proliferation of computing devices across various domains have resulted in a vast amount of data generation. As the amount of this data escalates, insights become increasingly difficult to obtain and thus the very purpose of collecting this data is lessened, even for sophisticated users. Although techniques have been developed to graphically visualize data, these techniques are challenged by rising complexity of the data due to diversity of the data, sources of the data, and amounts of the data being generated.

Conventional data analytics tools, for instance, are configured to import data from various sources (e.g., different network domains), format or otherwise transform the data into a certain format, and finally visualize the data in a manner to expose patterns or insights from the data. Patterns and other insights that are actually gleaned from the visualizations, however, are interpreted by an observing data scientist. As such, the interpretations are subject to potential human bias and are often ambiguous to the point where different data scientists observe different patterns and insights in the same visualization. While experienced data scientists that manually curate, organize, and interpret data provide additional quality assurance for resulting insights, the process for doing so is cumbersome and subject to human error and bias for even the most experienced data scientists. Accordingly, conventional techniques may lack accuracy and thus fail for their intended purpose and result in inefficient consumption of computational resources used to support these techniques by requiring repeated iterations.

SUMMARY

A dataset captioning system is described that generates captions of text to describe insights identified from a dataset, automatically and without user intervention. To do so, a dataset captioning system determines which data insights are likely to support potential visualizations of a dataset, generates text based on the insights, orders the text, processes the ordered text for readability, and then outputs the text as a caption. These techniques also include adjustments made to the complexity of the text, globalization of the text, inclusion of links to outside sources of information, translation of the text, and so on as part of generating the caption.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ automated caption generation techniques from a dataset as described herein.

FIG. 3 is a flow diagram depicting a procedure in an example implementation in which a caption is generated automatically and without user intervention from a dataset including text that corresponds to data insights.

FIG. 6 illustrates example operations usable by a datatype determination module of FIG. 2 to detect which type of data is contained within data subsets.

FIG. 7 is an illustration of an example of operations usable by a data insight determination module of FIG. 2 to detect salient temporal trends exhibited by the data entries.

FIG. 9 depicts a system in an example implementation showing operation of a caption formation module of FIG. 2 in greater detail.

FIG. 10 depicts an example of operations used to rank data insights based on scores for ordering as part of a caption.

DETAILED DESCRIPTION

Overview

Figure 2:
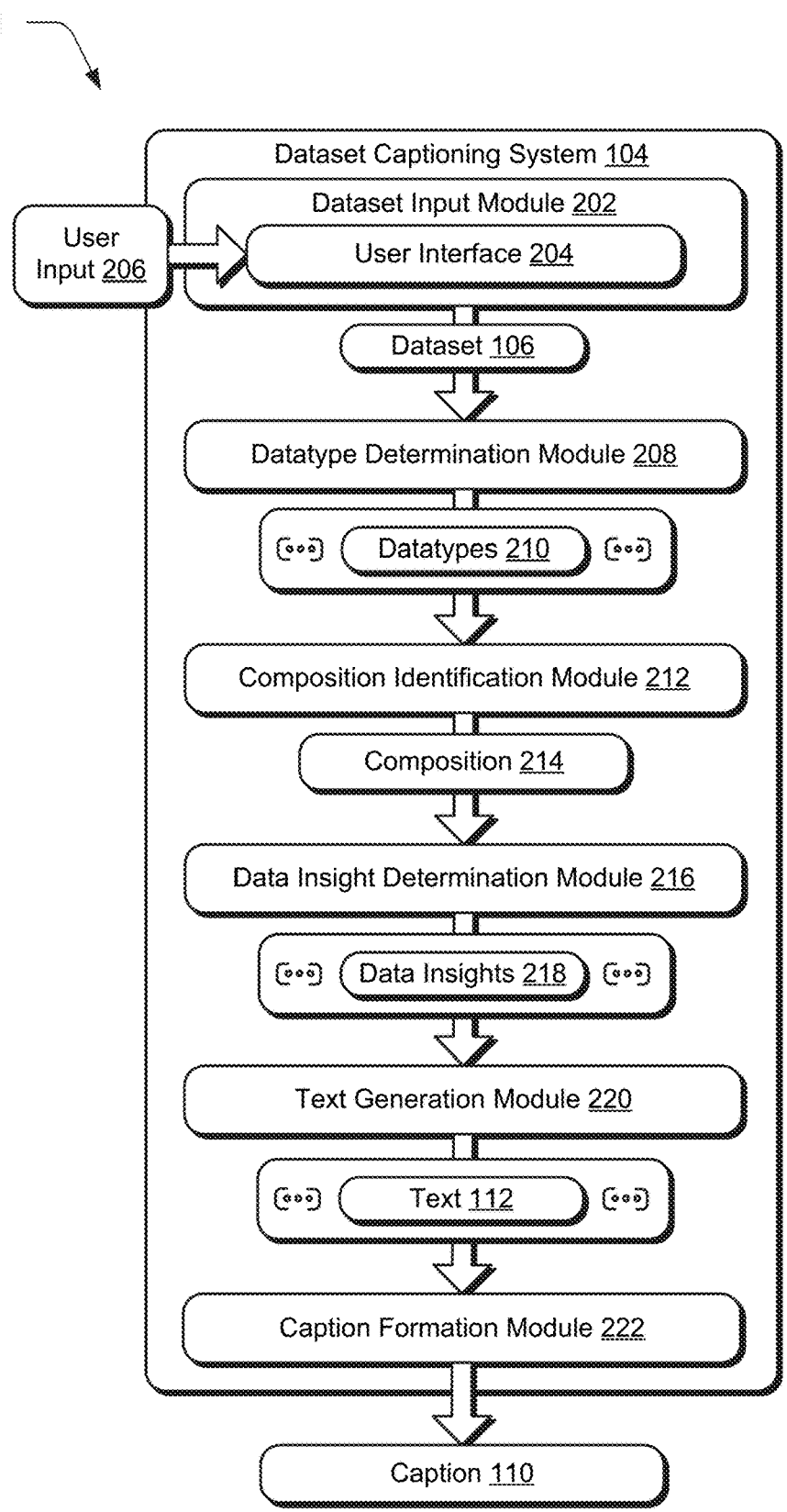
FIG. 2 depicts a system in an example implementation showing operation of a dataset captioning system of FIG. 1 in greater detail.
Figure 4:
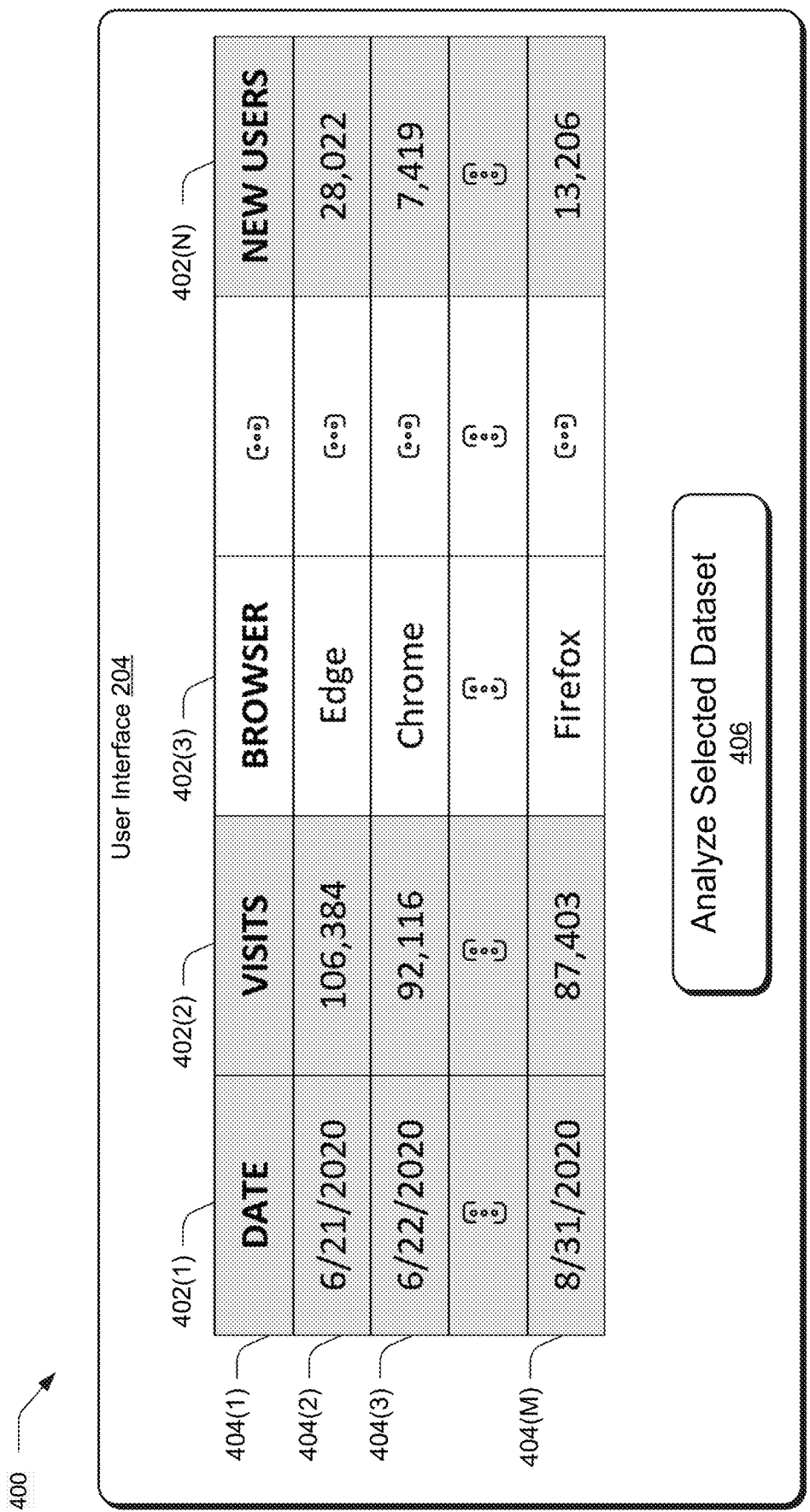
FIG. 4 depicts an example of a user interface supporting user selection of a dataset.
Figure 5:
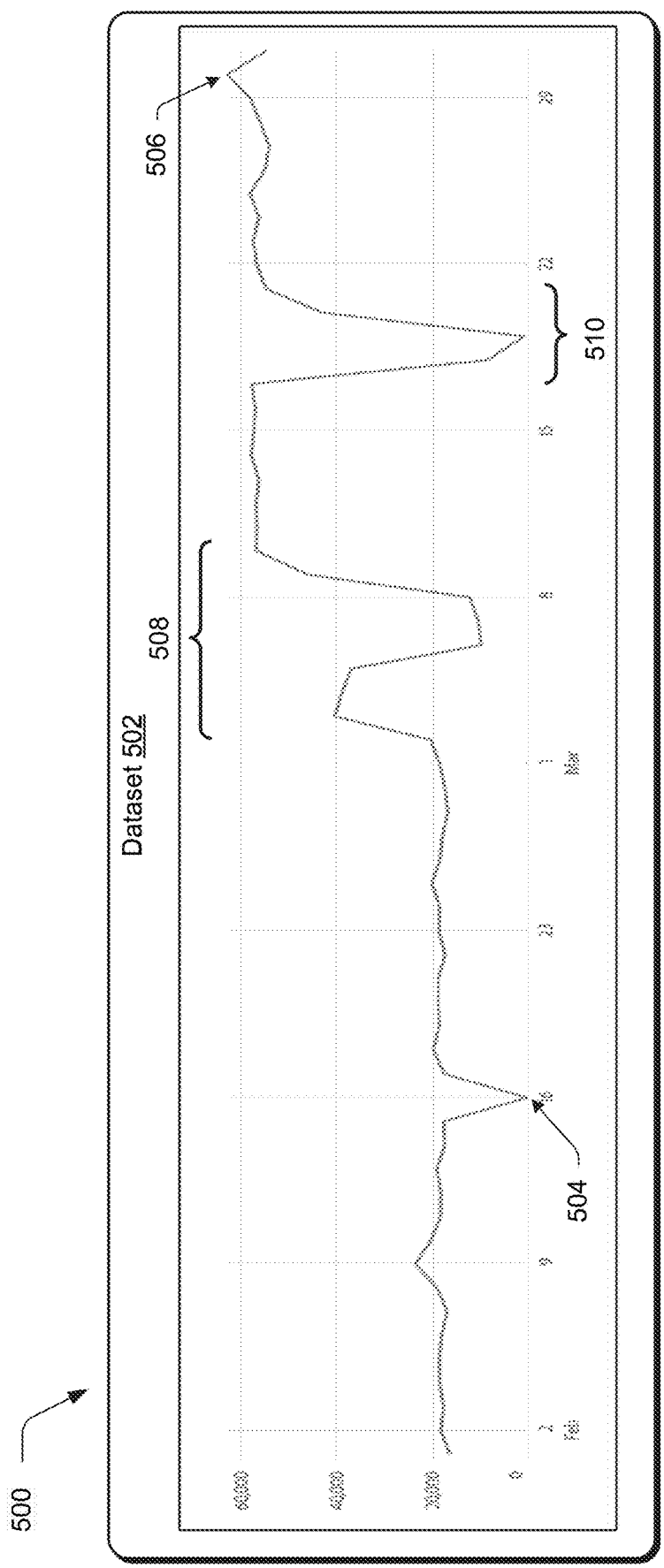
FIG. 5 depicts an example visualization of a dataset that includes data insights based on extremes, trends, and changes.

Computing devices that implement digital analytics systems are confronted with increases in a variety of domains that provide data, the types of data described by these sources, and the amounts of data. As such, an ability of these computing devices to provide insights into this data may fail and result in inefficient use of computational resources from repeated processing in attempts to do so. Accordingly, data analysts are tasked with manual "data wrangling" from these sources, which requires significant amounts of effort at a cognitive level and is costly at an user interaction level.

Data analysts, for instance, are tasked with importing the "correct" data from sources, cleaning the data into acceptable data types that are consumable by computing devices of a digital analytics system, and transforming the data in ways in which insightful patterns are perceptible through visualizations. Therefore, user interaction with user interfaces used by conventional data analytics systems are both inefficient with respect to the user as well as inefficient, computational resource wise, in order to support repeated user interaction necessitated by these conventional techniques.

Accordingly, computing device automated caption generation techniques from a dataset are described. In one example, a dataset captioning system generates captions of text to describe insights identified from a dataset, automatically and without user intervention. To do so, given an input of a dataset (e.g., that is suitable for rendering a visual chart), the dataset captioning system determines which data insights are likely to support potential visualizations of the dataset, generates text based on these insights, orders the text, processes the ordered text for readability, and then outputs the text as a caption. These techniques may also include adjustments made to the complexity of the text, globalization of the text, inclusion of links to outside sources of information, e.g., URLs containing information that is determined by the dataset captioning system as relevant to the caption based on text included in the caption. In this way, the dataset captioning system supports processing of vast amounts of data using a multitude of different dataset insights, simultaneously and in real time, which is not possible to be performed by a human being.

Functionality of the dataset captioning system is configurable in a variety of ways. The dataset captioning system, for instance, is implementable a service by a service provider system. This service is then leveraged by other services (e.g., via a network) to support a variety of computer functionality, such as for augmenting analysis involving auto-discovery of takeaways from data, easing communication including auto-narration of emails, mobile notifications, and intelligent alerts. This also improves accessibility in the consumption of the dataset, such as for users of small format computing devices (e.g., mobile phones and tablets) in which ease of interaction with the text has increased efficiency when compared to direct interaction with the dataset. This improves user interaction with the computing device as well as operation of the computing device, itself. Further discussion of these and other examples is included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium automated caption generation environment 100 in an example implementation that is operable to employ dataset captioning techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 includes a dataset captioning system 104. The dataset captioning system 104 is implemented at least partially in hardware of the computing device 102 to process and transform a dataset 106, which is illustrated as maintained in a storage device 108 of the computing device 102 in order to generate a caption 110 of text 112 that describes insights involving the dataset 106. Although illustrated as implemented locally at the computing device 102, functionality of the dataset captioning system 104 is implementable in whole or in part via functionality available via the network 114, such as part of a web service or "in the cloud."

The dataset 106 is configurable in a variety of forms to include a plurality of data entries. In one example, the data entries are organized as data subsets of the dataset that have a common characteristic, which is referred to as a "datatype" in the following discussion. The data subsets in a table example, for instance, correspond to rows or columns of the table (including portions thereof) such that the data entries in the rows or columns share a characteristic of the datatype. Data is thus organized in these data subsets to describe a corresponding characteristic and/or take a common form. Examples of datatypes include quantitative (e.g., 2, 110320, etc.), nominal (e.g., birthday, twins), ordinal (e.g., $1^{st}$, $2^{nd}$), date (e.g., Nov. 3, 2020), and so on.

As illustrated in the user interface 116 of the dataset captioning system 104 rendered by a display device 118, a dataset 106 is configured as a table 120 and includes a corresponding visualization of a graph 122. From this, the dataset captioning system 104 is configured to generate a caption 124 including text formed based on a variety of insights gleaned from the dataset 106, automatically and without user intervention.

Illustrated examples of text generated for respective data insights include "extremes," "trends," and "changes." Text from the caption 124 corresponding to "extremes," for instance, states "Harper Paige and Henry Patrick showed the total number of visits reached the highest of 65,280 on the day of 2020 Nov. 3." For "trends," the text includes "It was 100% more than average, which was 31,181" and for "changes" the text states "On 2020 Feb. 14, we saw the most significant rise in number of visits. It was 629 on the previous day before increasing by 6,693% to 75,078." As a result, the dataset captioning system 104 generates the caption 110 from the dataset 106 as ordered text corresponding to data insights. Further discussion of this and other examples is included in the following sections and shown using corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Automated Caption Generation from a Dataset

FIG. 2 depicts a system 200 in an example implementation showing operation of the dataset captioning system 104 of FIG. 1 in greater detail. FIG. 3 depicts a procedure 300 in an example implementation in which a caption is generated automatically and without user intervention by a dataset captioning system from a dataset including text that corresponds to data insights.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, a dataset input module 202 is employed by the dataset captioning system 104. The dataset input module 202 is configured to output a user interface 204, via which, a user input 206 is received identifying a dataset 106 having a plurality of data entries (block 302). As shown in an example implementation 400 of FIG. 4, the user interface 204 displays a larger dataset as a table having columns 402(1), 402(2), 402(3), . . . , 402(N) and rows 404(1), 404(2), 404(3), . . . , 404(M).

User inputs 206 are received via the user interface that select columns 402(1), 402(2), 402(N) as the dataset 106 for processing. Thus, the dataset 106 in this example includes a portion of a larger table. In this way, the user interface 204 supports user interaction by "clicking" a few columns to select individual data subsets. The user interface 204 is also configurable to support additional user interaction, such as to support user specification of datatypes of the data entries in the columns.

Text 112 is generated by the dataset captioning system 104 based on a plurality of data insights from a plurality of data entries of the dataset 106 (block 306). An example visualization 500 of a dataset 502 of FIG. 5, for instance, includes data insights based on extremes 504, 506, trends 508, and changes 510 and text is generated by the dataset captioning system 104 based on these data insights.

The data insights used by the dataset captioning system 104 to generate the text are based on datatypes included in the dataset 106. Accordingly, in the previous example the datatypes are specified via user inputs 206. In another example, the datatypes are determined automatically by a datatype determination module 208 as follows.

The datatype determination module 208, for instance, is configured to implement operations 600 of FIG. 6 that detect which type of data is contained within respective data subsets. The operations 600 are illustrated as pseudo-code that detects the datatypes from a plurality of different available datatypes by the datatype determination module 208. The operations 600 in this example are configured as a series of sequential detection steps involving different datatypes supported by the dataset captioning system 104. Examples of datatypes 210 include quantitative (e.g., two, 75,078), nominal (e.g., birthday, twins), ordinal (e.g., $1^{st}$, $2^{nd}$), date (e.g., Nov. 3, 2020), and so on. As illustrated, the operations 600 proceed from detecting quantitative types, to ordinal types, to temporal types, and if not one of those is classified as a nominal type.

The datatype determination module 208 is also configurable to detect semantic types from a pre-defined taxonomy, such as an email domain, geocode, RGB, and so forth. Use of semantic datatypes by the datatype determination module 208 supports generation of diverse, customized captions for different usage scenarios and thus extends use of this functionality to a variety of other digital services, such as for marketing, regional analysis, color trend forecasting, and so on. Other examples include augmenting analysis involving auto-discovery of takeaways from data, easing communication including auto-narration of emails, mobile notifications, and intelligent alerts. This also improves accessibility of the consumption of the dataset, such as for users of small format computing devices (e.g., mobile phones and tablets) in which ease of interaction with the text has increased efficiency when compared to direct interaction with the dataset 106.

The determined datatypes 210 are then output by the datatype determination module 208 for use in generating a caption 110, automatically and without user intervention, that textually describes the dataset (block 304). In the illustrated example, this is performed to determine a composition, i.e., a nature of "what makes up" the dataset 106. This composition is used as a guide to select which data insights are to be used to generate text 112 that is a subject of the caption 110 from the data entries of the dataset 106 (block 306).

To do so, a composition identification module 212 receives the datatypes 210 that have been determined by the datatype determination module 208 as being included in the dataset 106 (block 308). The composition identification module 212 then identifies the composition 214 (e.g., from a plurality of compositions) based on these datatypes 210 (block 310). This is performable by the composition identification module 212 in a variety of ways, including based on which datatypes 210 or combination of datatypes 210 are included in the dataset 106.

The composition identification module 212, for instance, detects that the datatypes 210 of data subsets in the dataset 106 include a combination of a "date" datatype and two "quantitative" datatypes for respective data subsets. From this, the composition identification module 212 infers potential visualizations corresponding a composition of the dataset that includes the combination of these types. The composition 214, for instance, is identified by the composition identification module 212 based on inference and insight generation using a set of pre-defined heuristics corresponding to taxonomy observations in natural language generation for visual analytics. This is usable to identify a variety of different compositions 214 that convey intent of data entries expressed by respective datasets 106. More than one composition may be identified by the composition identification module 212 for a respective dataset 106.

A temporal composition, for instance, is identified by the composition identification module 212 from datatypes 210 that include a datatype of "temporal" for at least one data subset and at least one "quantitative" datatype. In another instance, a segment comparison composition is identified by the composition identification module 212 from datatypes 210 that include a "nominal" datatype at least one "quantitative" datatype. A variety of other examples are also contemplated, such as anomaly detection, intelligent alert, and so on as described in further detail below.

The determined composition 214 in this example is then passed to a data insight determination module 216 to determine which data insights 218 of a plurality of data insights correspond to the composition 214. Examples of data insights include anomaly, cyclic pattern, derived value, distribution (relative value), change, and extremes such as minimum and maximum. In this way, processing of the dataset captioning system 104 and thus function of underlying computing device is improved by identifying which data insights 218 are pertinent to the dataset 106 based on the composition 214 and further exploring those insights, without consuming resources for other data insights that have a relatively lower likelihood of being pertinent. Other scenarios are also contemplated, e.g., to employ each data insight 218 and rank the results for output. In an implementation, a control is user selectable to specify which scenario is desired, e.g., based on composition or to employ each potential data insight.

Regardless of how the data insights 218 are obtained, a text generation module 220 is then leveraged by the dataset captioning system 104 to generate text 112 from the plurality of data entries of the dataset 106 (block 312) based on the data insights 218. This may be performed for a variety of usage scenarios. In one example, the composition identification module 212 identifies the compositions 214 of the dataset 106 is "temporal." A temporal composition, for instance, is identified by the composition identification module 212 based on inclusion of a datatype 210 of "temporal" for at least one data subset and inclusion of a datatype 210 of "quantitative."

From this, the data insight determination module 216 determines data insights 218 of extremes, trends, and changes that are identified as corresponding to this type of composition. The data insight determination module 216, based on these data insights 218, associates the quantitative data with each date, which are used by a text generation module 220 to generate text that describes the data insights 218.

The data insight determination module 216, for instance, is configured to implement operations 700 of FIG. 7 that detect salient temporal trends exhibited by the data entries. The operations 700 are illustrated as pseudo-code that implements a statistical test over the date range to detect any salient cyclic patterns.

Specifically, the operations 700 are used by the data insight determination module 216 to calculate auto-correlation values between the data series with its delayed copy at a particular cyclic window interval. The auto-correlation value is interpretable as a correlation coefficient. When the value is higher than a pre-defined or user-specified threshold, the cyclic pattern is considered statistically significant by the data insight determination module 216. The data insight determination module 216 then generates values for the data insight 218 that describes the cyclic pattern which is then used by the text generation module 220 to generate the text 112.

In an example, the test is performed using multiple temporal windows of different granularity. Granularities include every hour, every half-day, daily, weekly, biweekly, monthly, quarterly, yearly, etc. Other data insights 218 also pertain to the temporal composition, examples of which include period maximum, period minimum, dramatic change, in comparison with period average, and so forth.

Figure 8:
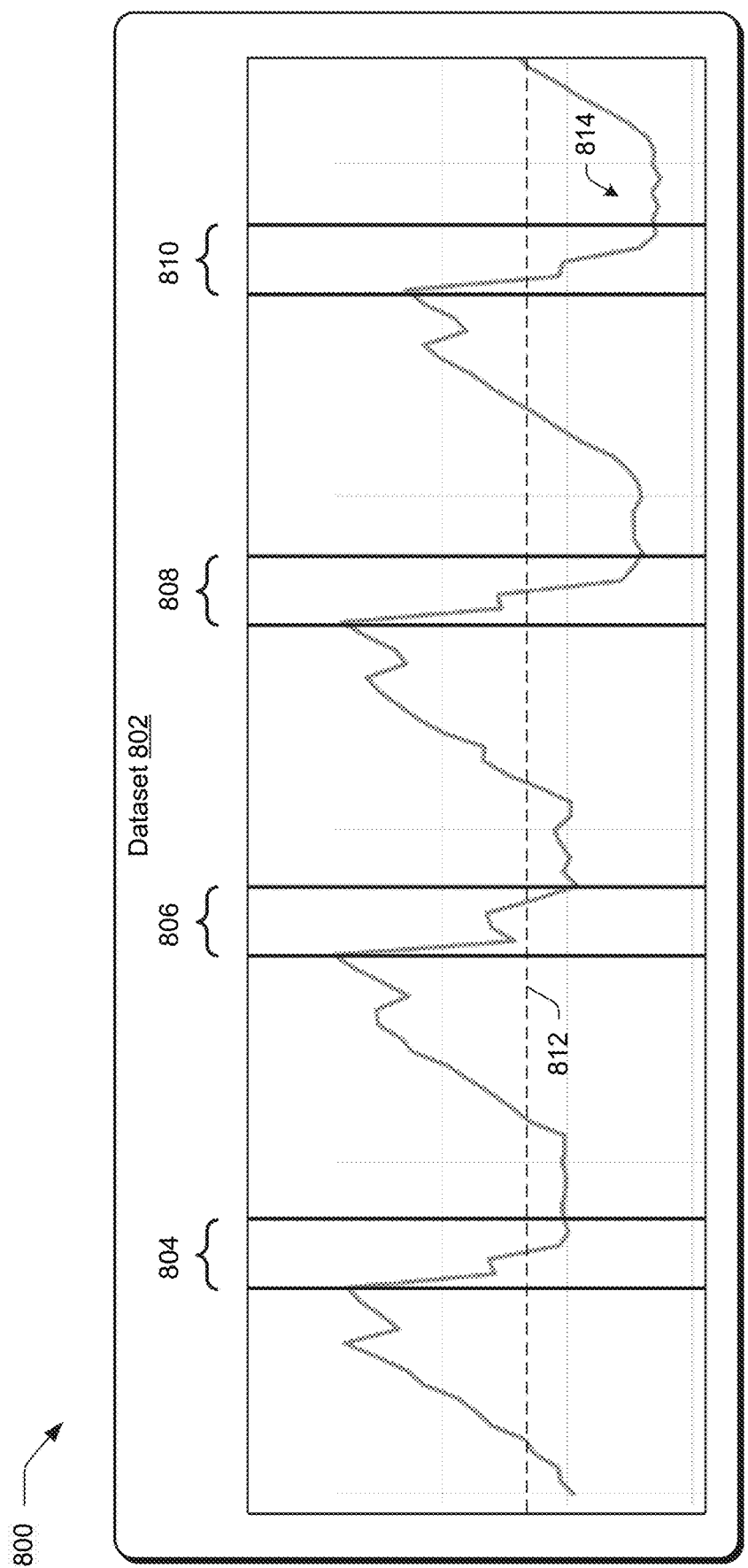
FIG. 8 depicts an example visualization of a dataset that includes data insights involving changes (climbs/drops), trends (averages), and extremes (peaks/valleys)

An example visualization 800 of a dataset 802 of FIG. 8, for instance, includes data insights involving changes 804, 806, 808, 810 (climbs/drops), trends 812 (averages), and extremes 814 (peaks/valleys). From this dataset 802, and the datatypes identified for the dataset 802, the text generation module 220 generates text 112 that is used as a basis by a caption formation module 222 to form a caption 110 (block 314).

For the illustrated dataset 802, the caption includes the text includes the following:

> Overall, there was a cyclic pattern of every 24 hours. For each day, the pack number of visits occurred at around 14:38 and the valley occurred at around 18:32. During this period, the total number of visits reach the highest of 2,926 during the hour of 15:00-16:00, May 12, 2020. It was 36% more than average, which was 2,139. In contrast, the lowest number of visits occurred during the hour of 22:00-23:00, May 16, 2020, which was 32% less than average. During 16:00-17:00, May 17, 2020, we say the most significant drop in number of visits. It was 2,665 at the end of the previous hour while during 16:700-17:00, May 17, 2020 it decreased by 27% to 1,939.

In this way, the data insights of extremes (e.g., "highest," "lowest"), changes (e.g., "most significant drop") and trends (e.g., "average") provide a basis for the text 112 generated by the text generation module 220 that is then used as a basis by the caption formation module 222 for form the caption 110.

Segment comparison is a type of composition 214 in which the dataset 106 includes a "nominal" datatype 210 and at least one "quantitative" datatype 210. The data insight determination module 216 and text generation module 220 are thus used to generate text 112 for the caption 110 that describe the characteristics of the segments. An example of which is describing which segments support a comparative advantage, e.g., 88% of consumers of a digital service have a particular browser type whereas only 23% of other digital services used this type of browser.

Another example of a composition 214 is anomaly detection, in which a dataset 106 includes at least one data subset having a quantitative type. The data insight determination module 216 in this scenario detects whether data values in the plurality of data entries in a data subset include an outlier based on heuristics, e.g., smaller than a first quartile minus interquartile range or larger than a third quartile plus interquartile range.

Intelligent alert is also a type of composition 214 in which the datatypes 210 include a quantitative type. A user input is received, for instance, to opt in and set alert criteria about a quantitative data subset, and an alert is generated when the selected data subset breaks the criteria. This use case is particularly applicable in settings in which the dataset 106 is uploaded in a streaming fashion, e.g. bundled from an upstream data lake. For example, a meteorologist specifies the dataset 106 to be streamed from satellite remote sensors to the dataset captioning system 104, with an alert set on precipitation. This triggers the dataset captioning system 104 to generate the caption 210 as an alert whenever the precipitation level falls out of the criteria. This insight is available in real-time to the meteorologist via a user interface through communication channels, e.g. smart speaker, email digestions, etc. A variety of other examples are also contemplated. Having discussed examples of how text 112 is generated based on data insights 218, the following discussion involves examples of how the caption 110 is generated from this text 112.

Figure 11:
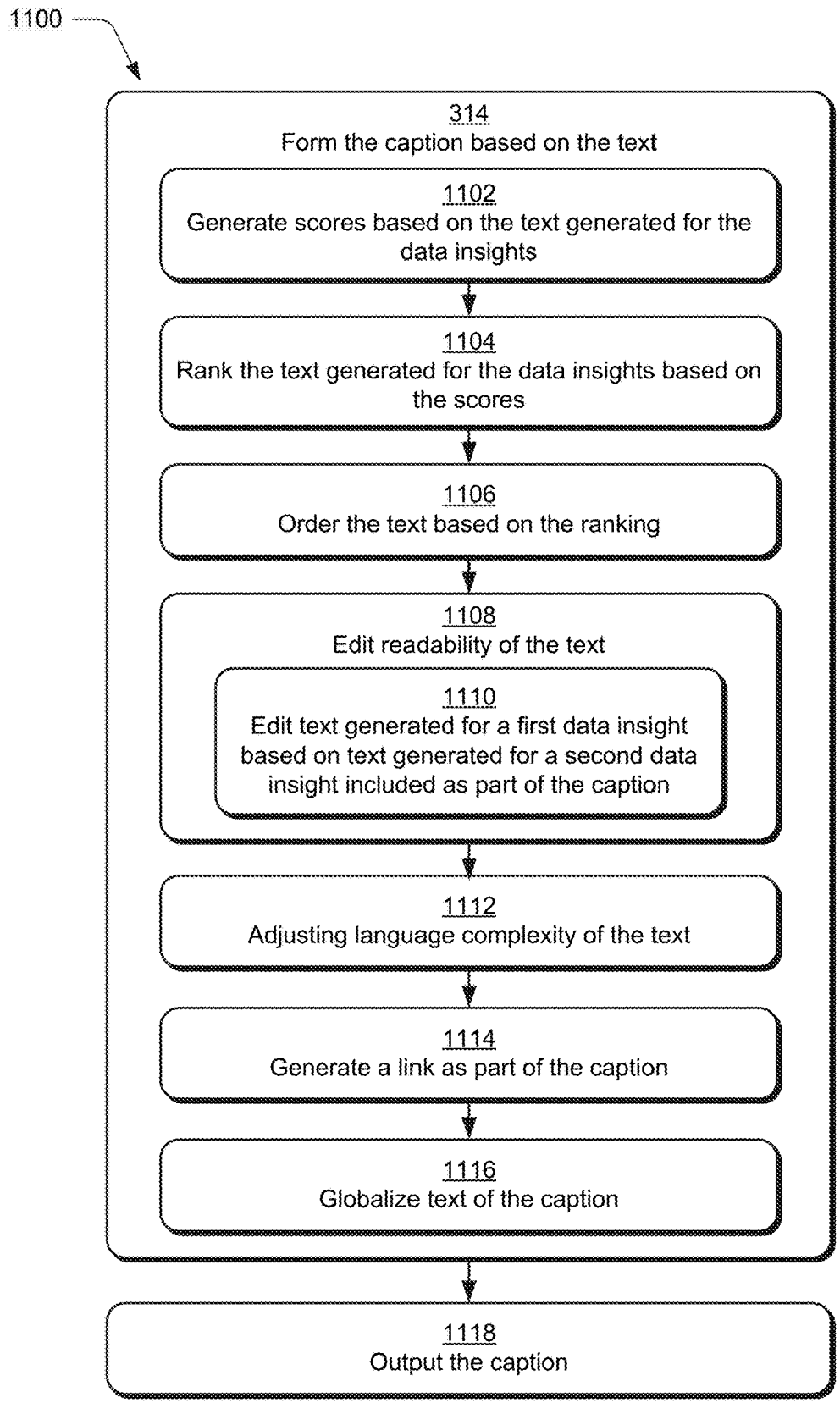
FIG. 11 is a flow diagram depicting a procedure in an example implementation in which a caption is generated automatically and without user intervention using text generated according to the data insights as described in relation to FIG. 3.

FIG. 9 depicts a system 900 in an example implementation showing operation of the caption formation module 222 of FIG. 2 in greater detail. FIG. 10 depicts an example of operations 1000 used to rank data insights based on scores for ordering as part of a caption. FIG. 11 depicts a procedure 1100 in which a caption is generated automatically and without user intervention using text generated according to the data insights as described in relation to FIG. 3.

Continuing from the previous examples, the text 112 generated based on corresponding data insights 218 is received as an unordered list. A ranking system 902 is first employed to rank the text 218 from the corresponding data insights 218. The ranking is definable in a variety of ways, examples of which include from general to specific (e.g., to order the text 122 from general to specific and conclusive types that provide supporting evidence to the general types), verbosity of respective items of text (e.g., from less to greater), and so forth.

In order to generate the ranking, the ranking system 902 employs a score generation module 904 that is representative of functionality to generate scores (block 1102), e.g., which described respective amounts of the above considerations such as specificity, verbosity, and so forth. An example of operations 1000 usable by the score generation module 904 to generate the score is illustrated in FIG. 10.

The algorithm as implemented by the score generation module 904 has six branching condition cases that are configured to handle different types of data insights 218. The score generation module 904 calculates scores based on types of data insights and attributes e.g., "ExtremeFunction," "InsightTier," "diffFactor." InsightTier is an attribute for the data insight of "extreme." InsightTier has ordinal values (e.g., 1, 2) that prioritize prominent insights from secondary insights in the same type. For example, the insight "Europe has the least number of items" has InsightTier of one for describing a maximum value. Another insight "US has the second least number of items" has "InsightTier" of two for describing a few other top values that may be important. "DiffFactor" is another insight attribute for the insight type on "Relative Value," which denotes the relative difference between the two values that are being compared in the insight. For example, the insight "The average displacement of blue parts is 3.76 times more than the red parts" has a DiffFactor of 3.76.

The text 112 generated for the data insights 218 is ranked by a ranking module 906 based on the scores (block 1104). The ranking module 906, for instance, ranks the text 122 based on the scores that are generated for respective considerations used to generate the scores, such as specificity and so on. The ranking module 906 further employs a threshold that is used to control the number of items of text 112 from corresponding data insights 218 that are to be included as part of the caption 110. The text 112 is then ordered by a text ordering module 908 based on the ranking (block 1106), e.g., from general to specific.

The caption formation module 222 also supports a variety of other functionality as part of generating the caption 110. In a first example, a readability module 910 is employed to edit the text to improve readability (block 1108), e.g., so there is logical and/or semantic flow between successive items of text 112 in the caption 110. For example, text generated for a first data insight is edited based on text generated for a second data insight included as part of the caption (block 1110).

To do so, the readability module 910 examines consecutive items of text and then edits the text 112 to link the consecutive items of text together. One example of an edit performable by the readability module 910 is co-reference. In co-reference, subjects that are repeatedly mentioned in two insights are removed. For example, when two consecutive items of text 112 share the same column name but with different insight types, the readability module 910 uses the co-reference pattern, e.g., edits the subject of the latter item of text into determiners such as "this," "that," "these," and "those." In an example of an edit based on subordination, text from data insights that are dependent on each other are linked. In example of an edit based on conjunction, the values between two insights are in a correlative or contrast relationship and thus edited accordingly.

The readability module 910 is also configured to check for safety of text 112 included in the caption. This is used to remove potentially offensive or inappropriate language, address trademarks, and so forth. As a result, the readability module 910 creates a natural, logical flow between items of text that increases user understanding of these items, together, as part of the caption 110.

The caption formation module 222 also includes a complexity adjustment module 912 that is representative of functionality to adjust language complexity of the text 112 (block 1112). The complexity adjustment module 912 does so by paraphrasing items of text, e.g., into simplified English. This is usable to replace complex words or phrases with simpler words or paraphrases. For example, if an original caption sentence in the caption paragraph is "Prevalence of hypertension will increase 7.2% from 2013 estimates.", simplified text recites "People who have higher blood pressure will increase 7.2% from 2013." The reverse is also performable by the complexity adjustment module, e.g., to incorporate complex words or phrases. In an implementation, the complexity adjustment module 912 outputs a control via a user interface that permits a user to specify an amount (i.e., degree) of complexity of text included in the caption 110.

In a text simplification example, the complexity adjustment module 912 implements lexical simplification. To do so, text is received as an input from the ranking system 902 or readability module 910. The complexity adjustment module 912 then processes the text to detect complex words or phrases as candidates for simplification. The candidate words or phrases, for example, are detected as a match to at least one paraphrase rule from a paraphrasing resource, e.g., a Simple PPDB database (Pavlick & Callison-Burch, 2016) which is publicly accessible and contains over four and a half million paraphrasing rules.

The PPDB database contains high-quality, effective paraphrasing rules that lead to simpler output paraphrases. Each rule in the database includes five elements: a syntactic category, an input word/phrase, an output word/phrase, a paraphrase quality score from one to five and a simplification score between zero to one. The simplification score is generated based on a supervised machine-learning model to determine whether a rule leads to "simplifying rules" or not. In this way, the complexity adjustment module 912 is configured to adjust complexity of language in the text 112 for inclusion in the caption 110.

The caption formation module 222 also includes a link generation module 914 that is configured to generate a link (e.g., a hyperlink) for inclusion as part of the caption (block 1114). The caption formation module 222, for instance, performs searches based on text 112, and from this, identifies resources available via a network (e.g., from publicly accessible databases) and includes links to those resources as part of the caption 110. The caption formation module 222 is also configured to recognize and annotate named-entities from the text 112, e.g., using machine-learning models trained on entity-annotation datasets.

A translation module 916 is also included as part of the caption formation module 220 to globalize the text 112 for inclusion as part of the caption 110 (block 1116). The translation module 916 is configured to translate the text 112 from one language into another. In an example, the translation module 916 invokes a machine translation service or translation model designed explicitly for caption translation. The translation module 916 may also incorporate a copy mechanism to ensure the translation not only fluently describes information in the non-English language, but also accurately retain the information from the original caption.

The caption is then output (block 1118), e.g., for display in a user interface, output to support additional services implemented by a service provider system, and so on. For example, the dataset captioning system, for instance, is implementable a service by a service provider system. This service is then by other services to support a variety of computer functionality, such as for augmenting analysis involving auto-discovery of takeaways from data, easing communication including auto-narration of emails, mobile notifications, and intelligent alerts, and improves accessibility of the consumption of the dataset, such as for users of small format computing devices (e.g., mobile phones and tablets) in which ease of interaction with the text has increased efficiency when compared to direct interaction with the dataset.

In an example of a service, the dataset caption system 104 exposes one REST API to generate captions on demand. The API uses a data narrator library to generate the captions and return the captions to the caller in a specific format. The REST API name is accepts an HTTP MIME type of Application/JSON and returns an HTTP response with the same format. The REST API supports a HTTP POST method. The API requires a JSON payload that has two keys: Metadata and Data. Metadata is an array of JSON objects, each object has keys and values. The purpose of the Metadata object is to describe entries in the data object by specifying the name, type and granularity of each of the data entries. Examples of supported types include "Quantitative," "Temporal," "Ordinal," and "Nominal." If the data is of type "Temporal," the data is further described with a temporal granularity, e.g., using a "Granularity" key. Examples of the different values for Granularity are: Minute, Hour, Day, Week, Month, Quarter, and Year. An example of the Metadata object is:

```
[
    {
        "name": "date",
        "type": "temporal",
        "granularity": "day",
        "itemAttribute": true
    },
    {
        "name": "visits",
        "type": "quantitative"
    }
]
```

Data is an array of JSON objects. Each data entry has a key with corresponding value. Each entry is an instance of the data (i.e., data entry) that is to be used to generate the caption. An example of a Data array is:

```
[
    {
        "date": "2020/02/01",
        "visits": 16161
    },
    {
        "date": "2020/02/02",
        "visits": 18029
    }
]
```

The response of the API is a JSON object that has 3 keys: status, data and message. Status can have 2 values: success or error. The data is a JSON object that has 2 keys: caption and insights. The message key is used to communicate the HTTP error codes or any other details that assists troubleshooting.

```
{
    "status": "success",
    "data": {
        "caption": "During this period, the number of visits peaked 62,580 on Mar. 30th. The highest number of visits was 100% more than the average of 31,181. At the same time, the lowest number of visits of 0 appeared on Feb. 16th, 100% less than average. The period from Mar. 19th to 23rd showed the most notable monotonic climb in the number of visits. It was 629 at the very beginning while increased by 56,629 to 57,258 in the end. The span from Mar. 17th to 19th showed the most cumulative drop in the number of visits. At the outset, it was 57,541. Surprisingly, at the close of this period, it decreased by 56,912 to 629.",
        "insights": [
            "The lowest number of visits of 0 appeared on Feb. 16th, 100% less than average",
            "During this period, the number of visits peaked 62,580 on Mar. 30th. The highest number of visits was 100% more than the average of 31,181",
            "The period from Mar. 19th to 23rd showed the most notable monotonic climb in the number of visits. It was 629 at the very beginning while increased by 56,629 to 57,258 in the end",
            "The span from Mar. 17th to 19th showed the most cumulative drop in the number of visits. At the outset, it was 57,541. Surprisingly, at the close of this period, it decreased by 56,912 to 629"
        ]
    },
    "message": ""
}
```

A variety of other examples are also contemplated as discussed above.

Example System and Device

Figure 12:
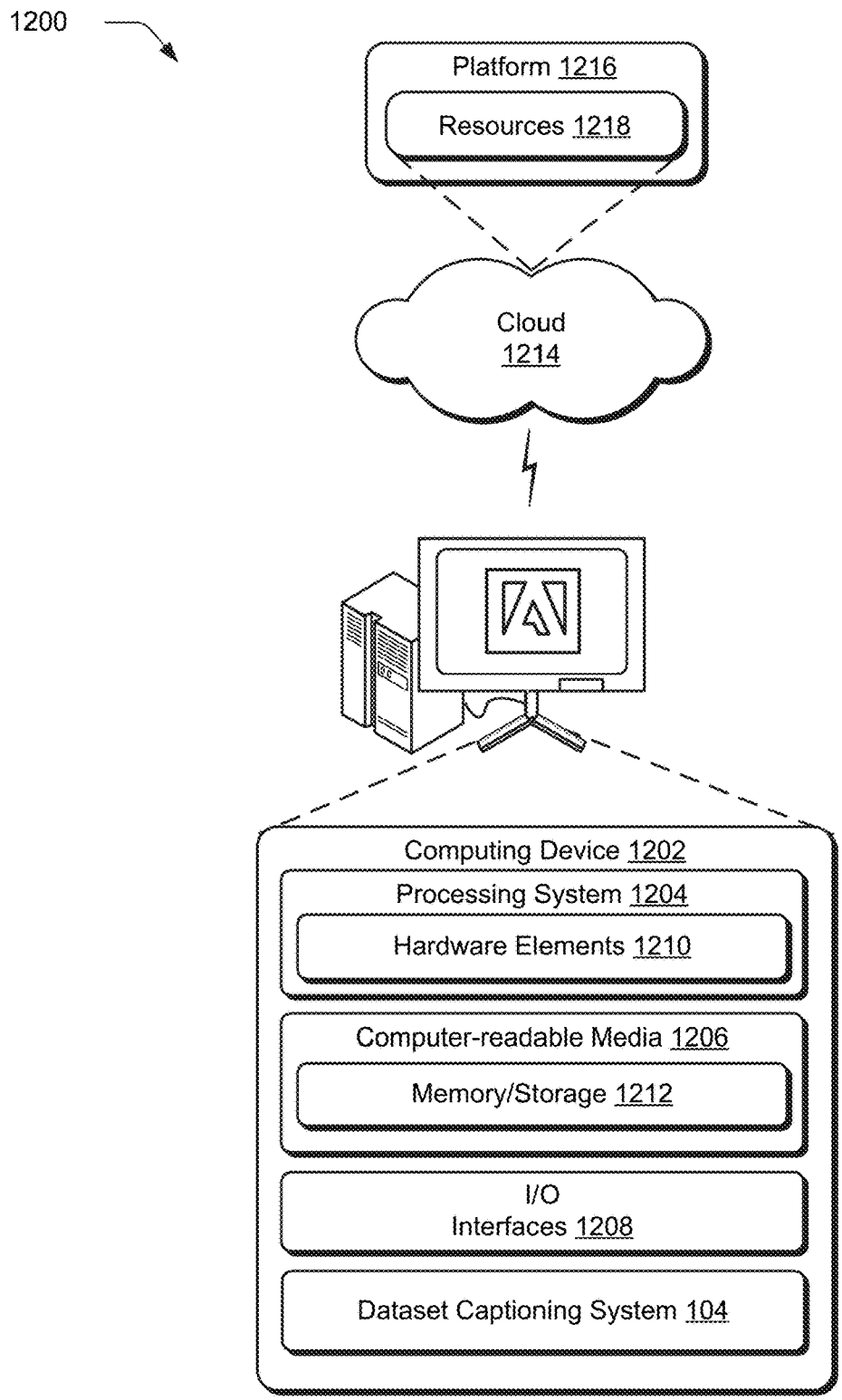
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the dataset captioning system 104. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating, by a processing device automatically and without user intervention, a caption that textually describes a dataset having a plurality of data entries organized as a plurality of data subsets, the generating including:
   determining which datatypes are included in the plurality of data subsets, respectively;
   identifying a composition including a visualization of the dataset from a plurality of compositions based on the datatypes and a set of pre-defined heuristics that detect whether the data subsets include an outlier;
   determining which data insights correspond to the composition by detecting cyclic patterns in the dataset and determining which cyclic patterns are statistically significant by comparing a correlation coefficient associated with a data insight to a threshold significance value;
   detecting semantic datatypes in the data subsets from a pre-defined taxonomy;
   generating text, based on the data insights that correspond to the composition and based on the semantic datatypes, from the plurality of data entries of the dataset;
   editing the text for readability based on a relationship between the data insights; and
   forming the caption based at least in part on the edited text.

2. The method as described in claim 1, wherein the forming includes:
   generating scores based on the text generated for the data insights; and
   ranking the text generated for the data insights based on the scores from general to specific.

3. The method as described in claim 2, wherein the forming of the caption includes ordering the text based on the ranking.

4. The method as described in claim 2, wherein the scores are based on degrees of specificity.

5. The method as described in claim 1, wherein the plurality of datatypes includes quantitative, nominal, ordinal, temporal, or semantic.

6. The method as described in claim 1, wherein the data insights include anomaly, cyclic pattern, derived value, relative value, threshold amount of change, or extremes based on a minimum amount or a maximum amount.

7. The method as described in claim 1, wherein the forming of the caption includes adjusting language complexity of the text.

8. The method as described in claim 1, wherein the forming of the caption includes editing text generated for a first said data insight based on text generated for a second said data insight as part of the caption.

9. The method as described in claim 1, wherein the forming of the caption includes generating a link, to a network address, included as part of the caption, the link generated based on at least a portion of the text.

10. The method as described in claim 1, wherein the identifying of the composition is based on which combination of the datatypes is included in the dataset.

11. The method as described in claim 10, wherein the composition is:
    temporal based on inclusion of a temporal datatype and a quantitative datatype as part of the datatypes of the plurality of data subsets; or
    segment comparison based on inclusion of a quantitative datatype and a quantitative datatype as part of the datatypes of the plurality of data subsets.

12. The method as described in claim 1, further comprising receiving a user input specifying the dataset via a user interface, the dataset including a portion of a table of a larger dataset in a user interface and the data subsets are configured as rows or columns of the table, the rows or the columns share a characteristic of the datatypes.

13. A system comprising:
    a dataset input module implemented at least partially in hardware of a processing device to receive a dataset having a plurality of data entries and identify a composition including a visualization of the dataset from a plurality of compositions based on datatypes of the composition and a set of pre-defined heuristics that detect whether the plurality of data entries include an outlier;
    a text generation module implemented at least partially in hardware of the processing device to generate text based on a plurality of data insights from the plurality of data entries of the dataset by determining which data insights correspond to the composition by detecting cyclic patterns in the dataset and determining which cyclic patterns are statistically significant by comparing a correlation coefficient associated with a data insight to a threshold significance value;

detecting semantic datatypes in the dataset from a pre-defined taxonomy; and a caption formation module implemented at least partially in hardware of the processing device to generate a caption including text based on the data insights that correspond to the composition and based on the semantic datatypes, the caption formation module including a complexity adjustment module configured to adjust language complexity of the text as part of the caption.

14. The system as described in claim 13, wherein the caption formation module further comprises:

a score generation module to generate scores corresponding to the data insights, respectively;

a ranking module configured to rank the text based on the scores corresponding to respective said data insights; and a text ordering module configured to order the text as part of the caption based on respective said scores.

15. The system as described in claim 14, wherein the scores are based on degrees of specificity.

16. The system as described in claim 13, wherein the caption formation module further comprises a readability module to edit the text generated for a first said data insight based on text generated for a second said data insight.

17. The system as described in claim 13, wherein the caption formation module further comprises a readability module to edit the text for safety.

18. The system as described in claim 13, wherein the caption formation module further comprises:

a link generation module configured to generate a link as part of the caption, the link generated based on at least a portion of the text; and a translation module configured to translate the text.

19. A system comprising:

means for generating, automatically and without user intervention, a caption that textually describes a dataset having a plurality of data entries, the generating means including:

means for receiving a dataset having a plurality of data entries;

means for identifying a composition including a visualization of the dataset from a plurality of compositions based on datatypes of the composition and a set of pre-defined heuristics that detect whether the plurality of data entries include an outlier;

means for determining which data insights correspond to the composition by detecting cyclic patterns in the dataset and determining which cyclic patterns are statistically significant by comparing a correlation coefficient associated with a data insight to a threshold significance value;

detecting semantic datatypes in the dataset from a pre-defined taxonomy;

means for generating text based on the data insights that correspond to the composition and based on the semantic datatypes;

means for ordering the text based on a ranking; and means for editing the ordered text for readability such that text generated for a first said data insight is edited based on text generated for a second said data insight.

20. The system as described in claim 19, further comprising:

means for adjusting language complexity of the text as part of the caption;

means for checking safety of the text as part of the caption;

means for translating the text as part of the caption; or means for generating a links, to a network address, included as part of the caption, the link generated based on at least a portion of the text.

* * * * *